United States Patent
Asada et al.

(10) Patent No.: US 6,344,962 B2
(45) Date of Patent: Feb. 5, 2002

(54) HIGH VOLTAGE CAPACITOR AND MAGNETRON

(75) Inventors: Hideo Asada; Tukasa Satoh; Setuo Sasaki; Isao Fujiwara, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/822,340

(22) Filed: Apr. 2, 2001

(30) Foreign Application Priority Data

Apr. 3, 2000 (JP) ......................................... 2000-101594
Mar. 6, 2001 (JP) ......................................... 2001-061417

(51) Int. Cl.⁷ ............................................... H01G 4/35
(52) U.S. Cl. ..................... 361/302; 361/311; 361/314; 361/315; 361/345
(58) Field of Search ................................ 361/302, 345, 361/328, 314, 307, 301, 311, 315

(56) References Cited

U.S. PATENT DOCUMENTS

| | | | | |
|---|---|---|---|---|
| 4,811,161 A | * | 3/1989 | Sasaki et al. | 361/302 |
| 4,814,938 A | * | 3/1989 | Arakawa et al. | 361/302 |
| 5,032,949 A | * | 7/1991 | Sasaki et al. | 361/302 |
| 5,142,436 A | * | 8/1992 | Lee et al. | 361/302 |
| 5,544,002 A | * | 8/1996 | Iwaya et al. | 361/302 |
| 5,729,425 A | * | 3/1998 | Fujiwara et al. | 361/345 |
| 6,288,886 B1 | * | 9/2001 | Sato et al. | 361/302 |

FOREIGN PATENT DOCUMENTS

| | | |
|---|---|---|
| JP | 63-121422 | 8/1988 |
| JP | 1-116423 | 8/1989 |
| JP | 1-135725 | 9/1989 |

* cited by examiner

*Primary Examiner*—Anthony Dinkins
*Assistant Examiner*—Nguyen Ha
(74) *Attorney, Agent, or Firm*—Oblon, Spivak, McClelland, Maier & Neustadt PC

(57) ABSTRACT

Through conductors pass through a capacitor and a grounding member. Insulating tubes cover the through conductors respectively. An insulating case is provided at one surface of the grounding member. An insulating cover is provided at an opposite surface of the grounding member. Insulating resins fill a space inside the insulating case, a space inside the insulating cover, and a space around the capacitor. The insulating case is constituted of a mixture containing polybutylene terephthalate and an inorganic substance which contains glass powder and ceramic powder. The content of the inorganic substance is set within a range of 15 wt % to 45 wt % relative to the entire quantity of the mixture.

4 Claims, 4 Drawing Sheets

HIGH VOLTAGE CAPACITOR AND MAGNETRON

BACKGROUND OF THE INVENTION

1. Field of the Invention

The present invention relates to a high-voltage capacitor and a magnetron having a filter constituted of the high-voltage capacitor.

2. Description of the Related Art

Well-known examples of high-voltage capacitors of this type in the prior art include those disclosed in Japanese Unexamined Patent Publication No. 1996-316099 and Japanese Unexamined Utility Model Publication No. 1992-40524. They have the following structural features in common. Two through holes are formed over a distance from each other at a dielectric ceramic material to constitute the capacitor. Individual electrodes that are independent of each other and a common electrode to be shared by the individual electrodes are provided at the two surfaces of the dielectric ceramic material at which the through holes open. The common electrode is secured onto a raised portion of a grounding member by a means such as soldering. Through conductors are provided so as to pass through the through holes at the capacitor and through holes formed at the grounding member. The through conductors are soldered to the individual electrodes at the capacitor by using electrode connectors or the like. An insulating case is fitted around the external circumference of the raised portion of the grounding member so as to enclose the capacitor. An insulating cover is fitted on the other side of the grounding member so as to enclose the through conductors. The insulating cover is mounted so that it comes in complete contact with the internal circumferential surface of the raised portion of the grounding member. Then, a thermo-setting insulating resin such as an epoxy resin is charged to fill the space inside the insulating case and outside the capacitor enclosed by the insulating case to assure satisfactory moisture resistance and insulation.

This type of high-voltage capacitor is crucial in application as a filter of the magnetron in a microwave oven, and, thus, since it is often used in a humid, dusty environment, it is required to achieve full voltage withstand performance in a humid environment.

When a high-voltage capacitor is mounted in a magnetron, the grounding member is grounded, and a high-voltage of, for instance, approximately 10 kV is applied to the through conductors. Since the insulating case is present within the path extending from the through conductors to the grounding member, the insulating case is subject to the high-voltage. As a result, the insulating case, too, is required to achieve full voltage withstand performance in a humid environment. The insulating case also must achieve properties such as fire resistance, tracking resistance, toughness and water repellency.

Materials that satisfy these performance requirements and are used to constitute the insulating case in the prior art include polybutylene terephthalate (PBT), polyethylene terephthalate and modified melamine. However, they still fail to achieve full voltage withstand performance in a humid environment.

In addition, it is desirable that the insulating case of this type of high-voltage capacitor has a small height since the high-voltage capacitor must be mounted in a magnetron. However, if the height of the insulating case is reduced, the creeping distance extending from the through conductors to the grounding members via the surface of the insulating case also becomes reduced to result in lowered voltage withstand performance in a humid environment.

SUMMARY OF THE INVENTION

It is an object of the present invention to provide a high-voltage capacitor achieving outstanding voltage withstand performance in a humid environment and a magnetron provided with a filter constituted of the high-voltage capacitor.

It is a further object of the present invention to provide a high-voltage capacitor having an insulating case with a small height and achieving outstanding voltage withstand performance in a humid environment and a magnetron provided with a filter constituted of the high-voltage capacitor.

In order to achieve the objects described above, the high-voltage capacitor according to the present invention comprises at least one grounding member, at least one capacitor, at least one through conductor, at least one insulating tube, at least one insulating case, at least one insulating cover and an insulating resin.

The grounding member is provided with a raised portion at one surface thereof, with at least one through hole passing from the one surface to another surface and formed at the raised portion. The capacitor includes a dielectric ceramic member having at least one through hole and is constituted by providing electrodes at the two surfaces of the dielectric ceramic member at which the through hole opens with one of the electrodes connected to the grounding member to achieve electrical continuity.

The through conductor passes through the capacitor and the grounding member and is connected to the other electrode to achieve electrical continuity. The insulating tube covers the through conductor.

The insulating case is provided at the one surface of the grounding member. The insulating cover is provided at the other surface of the grounding member. The insulating resin fills the space inside the insulating case and the space inside the insulating cover and also fills the space around the capacitor.

The insulating case is constituted of a material which is a mixture of polybutylene terephthalate and an inorganic material. The inorganic material, which contains glass powder and ceramic powder, is added so that its content is within a range of 15 wt % to 45 wt % relative to the entire quantity of the mixture.

When the high-voltage capacitor structured as described above is employed in the magnetron of a microwave oven, noise traveling through the through conductor can be absorbed through the filtering effect achieved by the capacitor by using the through conductor as a power supply terminal and connecting the capacitor between the through conductor and the grounding member achieving a ground potential.

In addition, the grounding member is provided with a through hole, and the capacitor is also provided with a through hole passing through the dielectric ceramic member, a through conductor with a higher potential relative to the potential of the ground can be installed between the grounding member achieving the ground potential and one of the electrodes at the capacitor while assuring a sufficient degree of electrical insulation achieved by the through holes.

Since the insulating resin fills the space around the capacitor, the reliability measured in reliability tests such as high temperature load tests and moisture resistance load tests and the reliability of the capacitor when it is utilized in a hot, humid environment are improved.

When a high-voltage capacitor is mounted in a magnetron, the grounding member is grounded, and a high-voltage is applied to the through conductor. Since the insulating case is provided within the path extending from the through conductors to the grounding member, the insulating case is subject to the high-voltage. As a result, the insulating case, too, is required to achieve full voltage withstand performance in a humid environment.

The insulating case in the high-voltage capacitor according to the present invention is constituted of a mixture containing polybutylene terephthalate and an inorganic material. The inorganic material contains glass powder and ceramic powder and its content relative to the entire quantity of the mixture is set within the range of 15 wt % to 45 wt %. Through testing conducted by the inventor of the present invention and the like, it has been confirmed that by adopting the structure described above in the insulating case, the humid-environment voltage withstand performance of the high-voltage capacitor is greatly improved.

The high-voltage capacitor according to the present invention having an insulating case structured as described above achieves superior voltage withstand performance in a humid environment as explained above. Thus, even if the height of the insulating case is reduced and, as a result, the creeping distance extending from the through conductor to the grounding member via the surface of the insulating case, too, becomes shorter, outstanding voltage withstand performance in a humid environment is assured.

In a desirable application, the insulating case has a height of 12 mm or greater with one end thereof inserted in the external circumferential side of the raised portion. Through testing conducted by the inventor of the present invention and the like, it has been confirmed that the required voltage withstand performance is assured even in a humid environment by setting the height of the insulating case to at least 12 mm.

In addition, in a desirable example of the high-voltage capacitor, the through conductor is constituted of a molding formed in the shape of a round bar with a tab portion formed by press-machining the round bar. In a through conductor adopting this structure, a connecting portion such as a caulked joint to connect the through portion, which passes through the capacitor, to the tab portion is not necessary. As a result, a high-voltage capacitor having an insulating case with a small height is realized.

BRIEF DESCRIPTION OF THE DRAWINGS

Other objects, structural features and advantages of the present invention are explained in further detail by referring to the attached drawings. The attached drawings simply present illustrations of embodiments.

DETAILED DESCRIPTION OF THE PREFERRED EMBODIMENTS

Figure 1:
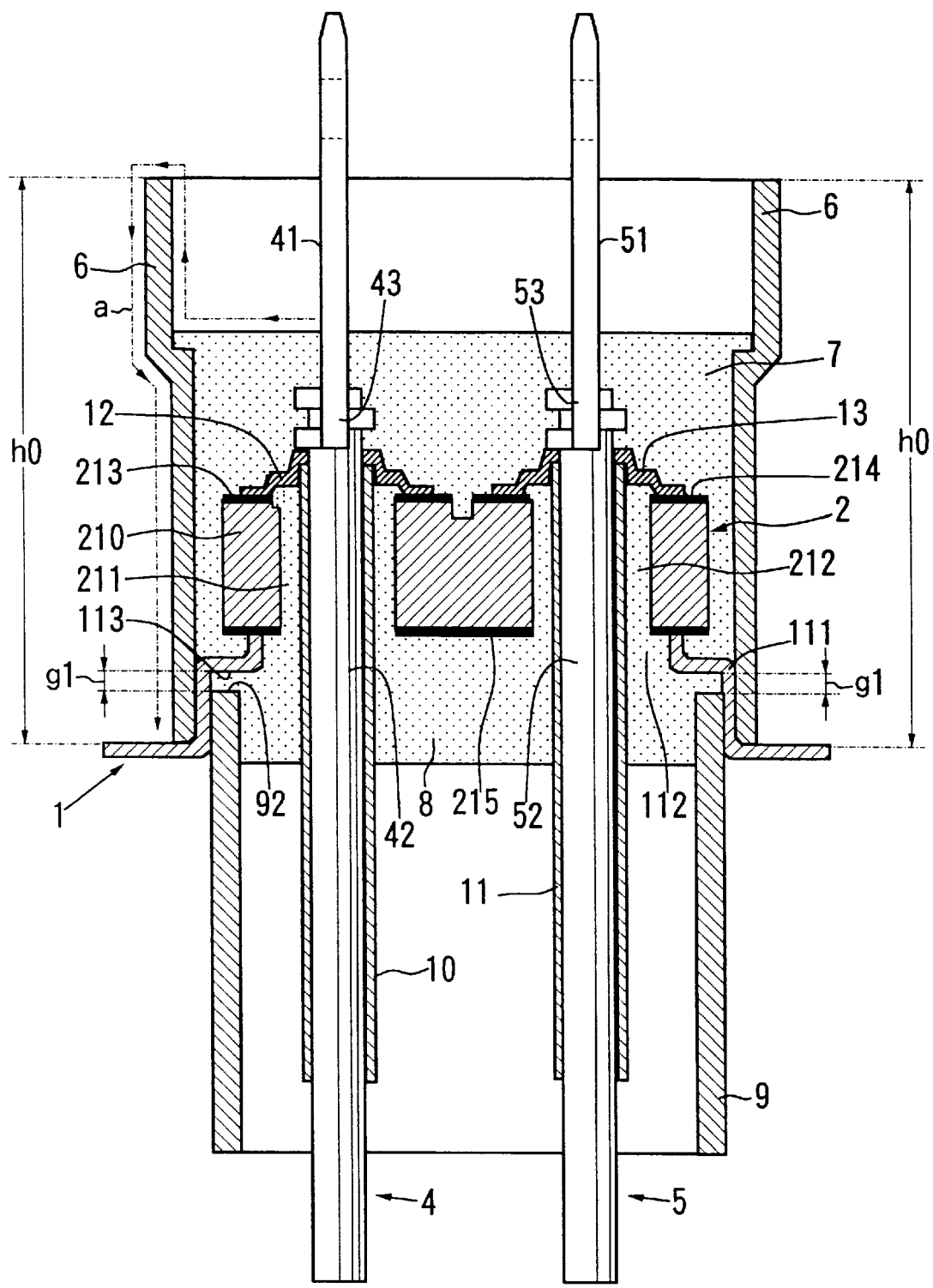
FIG. 1 is a cross sectional view of an embodiment of the high-voltage capacitor according to the present invention.
Figure 2:
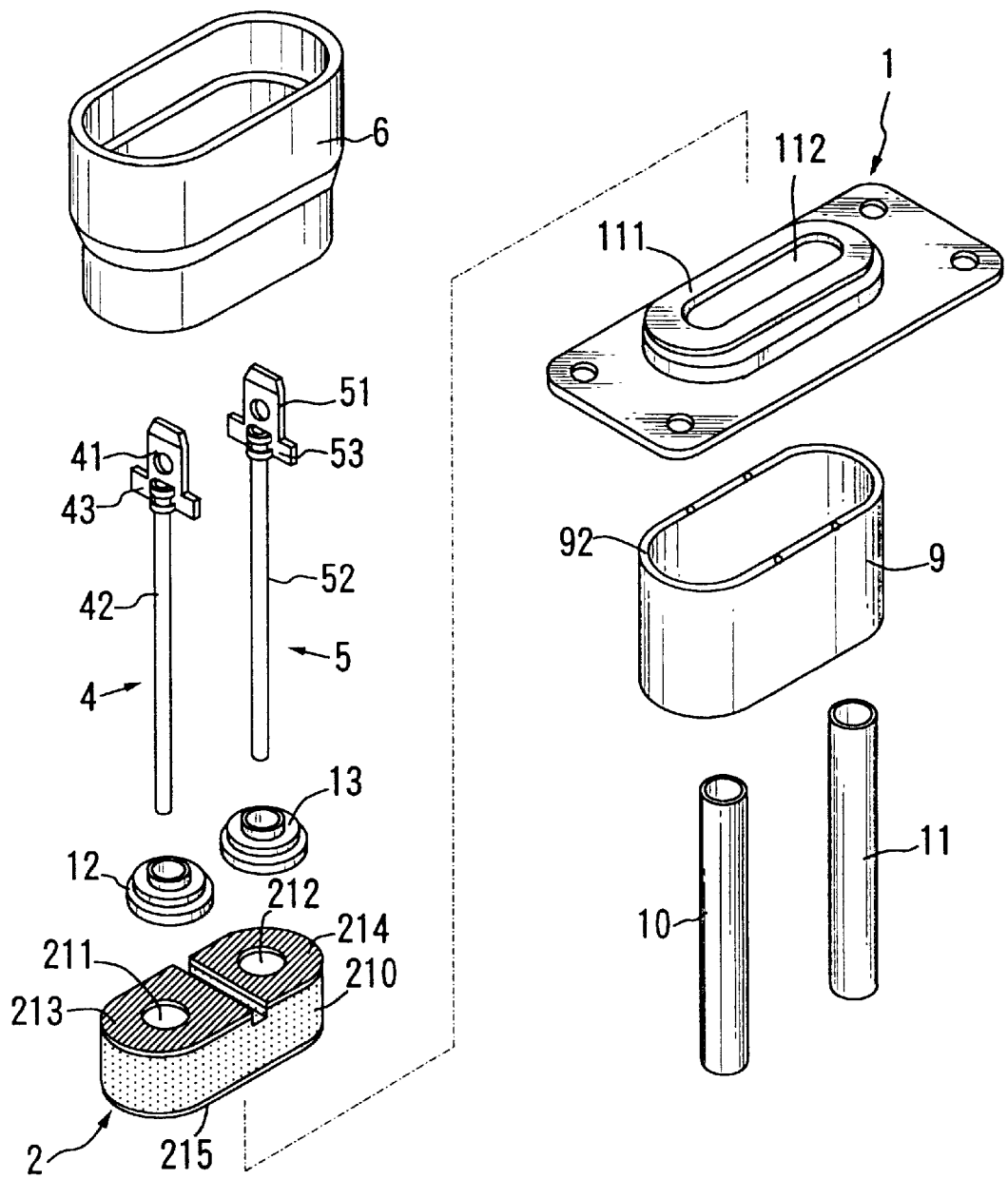
FIG. 2 is an exploded perspective view of the high-voltage capacitor shown in FIG. 1.

Referring to FIGS. 1 and 2, the high-voltage capacitor according to the present invention includes a grounding member 1, a capacitor 2, through conductors 4 and 5, insulating tubes 10 and 11, an insulating case 6, an insulating cover 9 and insulating resin portions 7 and 8. The grounding member 1 is provided with a raised portion 111 at one surface thereof, with the raised portion 111 having a through hole 112 passing through from the one surface to the opposite surface.

The capacitor 2 includes a dielectric ceramic member 210 having through holes 211 and 212. The capacitor 2 is constituted by providing electrodes 213 to 215 at the two surfaces at which the through holes 211 and 212 of the dielectric ceramic member 210 open. The electrode 215 of the capacitor 2 is connected to the grounding member 1 to achieve electrical continuity. To explain in further detail, the capacitor 2 is located on the raised portion 111 of the grounding member 1, and the electrode 215 is secured to the raised portion 111 by a means such as soldering. The composition of the dielectric ceramic member 210 constituting the capacitor 2 is of the known art. Specific examples include the composition whose main constituent is $BaTiO_3$—$BaZrO_3$—$CaTiO_3$—$MgTiO_3$ with a single or a plurality of additives mixed in.

The through conductors 4 and 5 pass through the capacitor 2 and the grounding member 1 and are respectively connected to the electrodes 213 and 214 to achieve electrical continuity. More specifically, the through conductor 4 passes through the through hole 211 and the through hole 112 and is connected to the electrode 213 via an electrode connector 12 to achieve electrical continuity. Also, the through conductor 5 passes through the through hole 212 and the through hole 112 and is connected to the electrode 214 via an electrode connector 13 to achieve electrical continuity. The through conductor 4 in the figures includes a through portion 42 passing through the capacitor 2 and a tab portion 41 used as a tab connector. The through portion 42 and the tab portion 41 are connected by a means such as a caulked joint. Likewise, the through conductor 5 in the figures includes a through portion 52 passing through the capacitor 2 and a tab portion 51 which is utilized as a tab connector. The through portion 52 and the tab portion 51 are connected by a caulked joint 53.

The insulating tubes 10 and 11 cover the portions of the through conductors 4 and 5 respectively located inside the through holes 211 and 212. The insulating tubes 10 and 11 are constituted of silicon or the like.

The insulating case 6 is provided at one surface of the grounding member 1. One end of the insulating case 6 is fitted around the external circumference of the raised portion 111.

The insulating cover 9 is provided at the opposite surface of the grounding member 1. One end of the insulating cover 9 is inserted in the internal circumference of the raised portion 111. The insulating cover 9 may be constituted of polybutylene terephthalate (PBT), polyethylene terephthalate or modified melamine.

The insulating resin portions 7 and 8 fill the space inside the insulating case 6 and the space inside the insulating cover 9 and also fill the space around the capacitor 2. To explain this in further detail, the insulating resin 7 fills the space outside the capacitor 2 toward the one surface of the grounding member 1 and is in complete contact with the surface of the dielectric ceramic member 210. The insulating resin 8 fills the space inside the raised portion 111 provided at the grounding member 1 and fills the through holes 211 and 212 at the capacitor 2, and is in complete contact with the surface of the dielectric ceramic member 210. The insulating resin portions 7 and 8 may be constituted of a thermo-setting resin such as urethane resin or an epoxy resin. Alternatively, they may be constituted of a phenol resin, a silicon resin or the like.

In the embodiment illustrated in the figures, one end surface 92 of the insulating cover 9 faces opposite an inner surface (ceiling surface 113) of the raised portion 111 at the grounding member 1 over a gap g1, with the space inside the gap g1 filled with the insulating resin 8.

In the high-voltage capacitor described above, the electrode 215 of the capacitor 2 is secured onto the one surface of the grounding member 1 and is set on the grounding member 1. The through conductors 4 and 5 which pass through capacitor 2 and the grounding member 1 are connected to the electrodes 213 and 214 respectively to achieve electrical continuity. As a result, when the high-voltage capacitor is utilized in the magnetron of a microwave oven, noise traveling through the through conductors 4 and 5 is absorbed through the filtering effect achieved by the capacitor 2 by using the through conductors 4 and 5 as power supply terminals and connecting the capacitor 2 between the conductors 4 and 5 and the grounding member 1 achieving the ground potential.

Since the grounding member 1 is provided with at least one through hole 112 and the capacitor 2 is provided with at least one through hole 211 or 212 passing through the dielectric ceramic member 210, the through conductors 4 and 5 with higher potential relative to the ground potential are installed between the grounding member 1 at the ground potential and the electrode 215 of the capacitor 2 while ensuring good electrical insulation with the through holes 211 and 212.

Since the insulating resin portions 7 and 8 fill the space around the capacitor 2, the reliability measured in reliability tests such as high-temperature load tests and moisture resistance load tests or the reliability of the capacitor when it is operated in a hot and humid environment is improved.

When the high-voltage capacitor is employed in a magnetron, the grounding member 1 is grounded and a high-voltage is applied to the through conductors 4 and 5. Since the insulating case is located within the path extending from the through conductors 4 and 5 to the grounding member 1, the high-voltage is also applied to the insulating case 6. Thus, the insulating case 6 needs to achieve a high level of voltage withstand performance in a humid environment.

According to the present invention, the insulating case 6 is constituted of a mixture containing polybutylene terephthalate and an inorganic substance as a means for improving the humid environment voltage withstand performance of the insulating case 6. The content of the inorganic substance which includes glass powder and ceramic powder relative to the entire quantity of the mixture is set within a range of 15 wt % to 45 wt %, more desirably within a range of 20 wt % to 40 wt % and even more desirably, at approximately 30 wt %.

If the content of the inorganic substance relative to the entire quantity of the mixture is less than 15 wt %, a sufficient degree of voltage withstand performance in a humid environment cannot be achieved. If the content of the inorganic substance exceeds 45 wt %, the polybutylene terephthalate content is reduced to less than 50 wt % and a sufficient degree of mechanical strength cannot be achieved for the insulating case.

The glass powder may be standard industrial glass powder. The ceramic powder may be $SiO_2$ powder, $Al_2O_3$ powder or a mixture of these.

The content of the inorganic substance constituted of the glass powder and the ceramic powder in the insulating case 6 relative to the entire quantity of the mixture is 30 wt % in the embodiment. The contents of the glass powder and the ceramic powder relative to the entire quantity of the mixture are both 15 wt %.

Through testing conducted by the inventor of the present invention and the like, it has been confirmed that the voltage withstanding performance of the high-voltage, feed-through capacitor having the insulating case 6 structured as described above in a humid environment is greatly improved.

The inventor of the present invention and the like conducted moisture resistance/voltage withstanding tests in order to verify the external insulation performance achieved by the high-voltage capacitor in the embodiment. TABLE I presents the results of the moisture resistance/voltage withstanding tests. The insulating case of the high-voltage capacitor, which underwent the moisture resistance/voltage withstanding tests was constituted by hot-forming a mixture containing polybutylene terephthalate and an inorganic substance. The inorganic substance contained glass powder and ceramic powder with its content relative to the entire quantity of the mixture set at 30 wt %. The contents of the glass powder and the ceramic powder relative to the entire quantity of the mixture were both set at 15 wt %.

For purposes of comparison, moisture resistance/voltage withstanding tests were also conducted on a high-voltage capacitor in the prior art. The high-voltage capacitor of the prior art that underwent the tests was structured identically to the high-voltage capacitor in the embodiment except that its insulating case was constituted of high-quality polybutylene terephthalate resin G2930 manufactured by Mitsubishi Rayon Inc.

For each moisture resistance/voltage withstanding test, the high-voltage capacitor was placed inside an acrylic box and the atmosphere inside the acrylic box was constantly humidified by using a humidifier. A voltage was applied to the high-voltage capacitor from a microwave oven power supply. In more specific terms, a DC voltage of 10 kV was applied to the high-voltage capacitor through application cycles each comprising 10 seconds of an on-period and five seconds of an off-period with the application cycles sustained until the high-voltage capacitor became burned and electrically continuous. The varying number of application cycles (hereafter referred to as the number of continuity-inducing application cycles) leading to the occurrence of electrical continuity due to burning are presented in TABLE I. It is to be noted that each number of continuity-inducing application cycles represents the number of application cycles recorded for a sample which became burned and electrically continuous at the smallest number of application cycles among 10 samples tested at each of the various heights set for the insulating case. A larger number of continuity-inducing application cycles indicates superior voltage withstand performance in a humid environment.

TABLE I

| Height of insulating case measured from end surface of grounding member | 20 mm | 18 mm | 16 mm | 14 mm | 12 mm | 10 mm |
|---|---|---|---|---|---|---|
| High-voltage | 182 | 128 | 52 | — | — | — |

TABLE I-continued

| | | | | | | |
|---|---|---|---|---|---|---|
| capacitor in prior art | cycles | cycles | cycles | | | |
| High-voltage capacitor according to present invention | 500 cycles or more | 500 cycles or more | 500 cycles or more | 420 cycles | 185 cycles | 86 cycles |

In TABLE I, the number of continuity-inducing application cycles recorded for the high-voltage capacitor in the embodiment at a given height should be compared against the number of continuity-inducing application cycles recorded for the high-voltage capacitor in the prior art at the same height. The results presented in TABLE I indicate that compared to the high-voltage capacitor in the prior art, the humid environment voltage withstand performance of the high-voltage capacitor is greatly improved.

The high-voltage capacitor according to the present invention having the insulating case 6 structured as explained above achieves a high level of voltage withstand performance in a humid environment. Thus, even if the height h0 of the insulating case 6 is reduced and, as a result, the length of the path "a" (creeping distance) extending from the through conductors 4 and 5 to the grounding member 1 via the surface of the insulating case 6 is also reduced, outstanding voltage withstand performance in a humid environment is assured. TABLE I indicates that even when the height h0 of the insulating case 6 in the high-voltage capacitor according to the present invention is set at 12 mm, a voltage withstand performance in a humid environment corresponding to 185 continuity-inducing application cycles is assured.

Under normal circumstances, the height of the insulating case in a high-voltage capacitor is set equal to or smaller than 20 mm, to ensure that the high-voltage capacitor can be fitted in a magnetron with ease. As indicated in TABLE I, the number of continuity-inducing application cycles in the high-voltage capacitor in the prior art having an insulating case with a height of 20 mm is 182.

The insulating case 6 of a high-voltage capacitor should preferably have a height h0 as small as 12 mm. As indicated in TABLE I, when the height h0 of the insulating case in the high-voltage capacitor according to the present invention is set to 12 mm or greater, voltage withstand performance in a humid environment that is comparable to, or superior to that of the high-voltage capacitor in the prior art (with the height h0 of the insulating case at h0=20 mm), is achieved.

Figure 3:
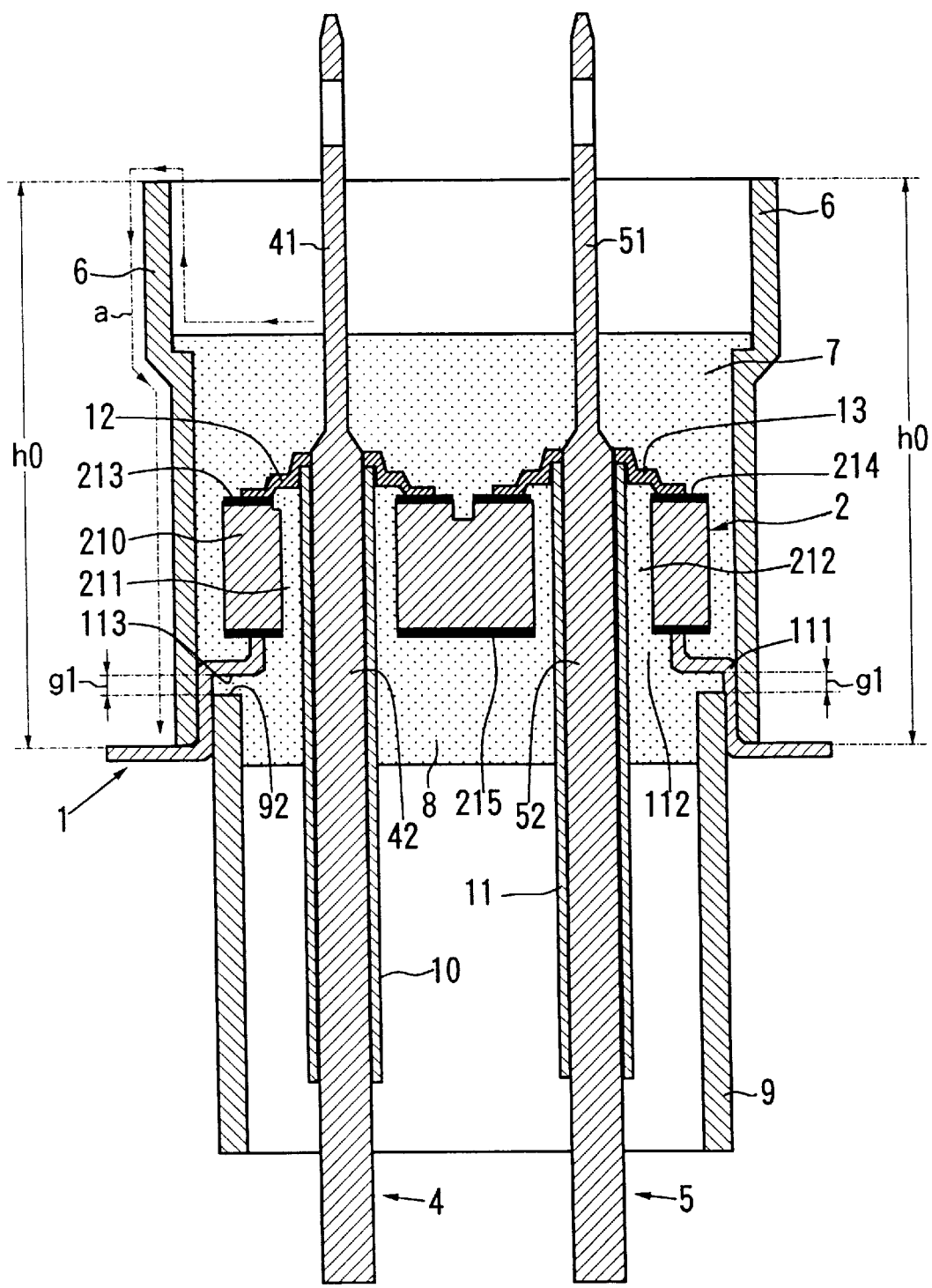
FIG. 3 is a cross-sectional view of another embodiment of the high-voltage capacitor according to the present invention.

FIG. 3 is a cross-sectional view of another embodiment of the high-voltage capacitor according to the present invention. In the figure, the same reference numbers as those in FIGS. 1 and 2 are assigned to components identical to the corresponding components in the high-voltage capacitor in FIG. 1. The high-voltage capacitor in FIG. 3 is characterized in that the through conductor 4 is constituted of a molding formed in the shape of a round bar having a tab portion 41 formed by press-machining the round bar. The through conductor 5, too, is constituted of a molding formed in the shape of a round bar having a tab portion 51 formed by press-machining the round bar, as is the through conductor 4. The through conductors 4 and 5 in the figure are each constituted of a round bar molding with a diameter of 2 mm, and by press-machining the round bars having a diameter of 2 mm, tab portions 41 and 51 with a width of 5.2 mm and a thickness of 0.5 mm are formed. The tab portions with a sectional area equal to or smaller than the sectional area of the tab portions 41 and 51 in the figure can be formed by press-machining round bars with a diameter of 2 mm. For instance, tab portions with a width of 4.75 mm and a thickness of 0.6 mm may be formed, instead.

In the high-voltage capacitor shown in FIG. 3, the through conductors 4 and 5 are constituted of round bar moldings with their tab portions 41 and 51 formed by press-machining the round bars. By adopting this structure in the through conductors 4 and 5, no connectors such as caulked joints are required to connect the through portions 42 and 52 passing through the capacitor 2 to the tab portions 41 and 51. Thus, a high-voltage capacitor having an insulating case 6 with a small height h0 is realized.

Figure 4:
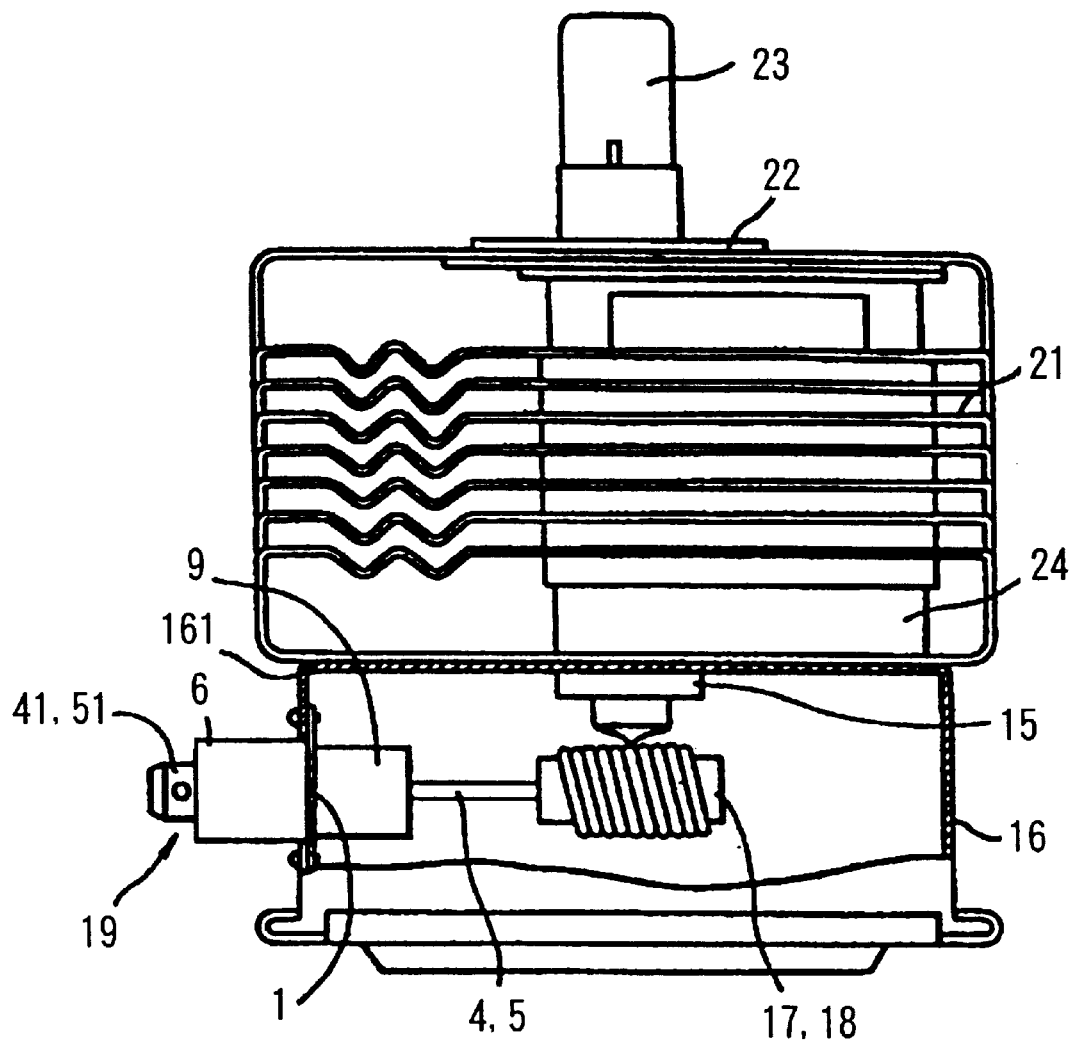
FIG. 4 is a cross-sectional view of a portion of a magnetron mounted with a filter constituted of the high-voltage capacitor according to the present invention.

FIG. 4 is a cross-sectional view of a portion of a magnetron mounted with a filter constituted of the high-voltage capacitor according to the present invention. In the figure, reference number 15 indicates a cathode stem, reference number 16 indicates a filter box, reference numbers 17 and 18 each indicate an inductor and reference number 19 indicates the high-voltage capacitor according to the present invention utilized in conjunction with the inductors 17 and 18 to constitute a filter. The filter box 16 encloses the cathode stem 15, and the high-voltage capacitor 19 is provided so as to allow the insulating resin 7 to be exposed outside through a through hole formed at a side plate 161 of the filter box 16 with its grounding member 1 securely attached to the side plate 161 of the filter box 16. The inductors 17 and 18 are connected in series between the cathode terminal of the cathode stem 15 and the through conductors 4 and 5 of the high-voltage capacitor 19 inside the filter box 16. Reference number 21 indicates cooling fins, reference number 22 indicates a gasket, reference number 23 indicates an RF output end and reference number 24 indicates a magnet.

In order to oscillate the magnetron in a microwave oven, of voltage of approximately 4 $kV_{0-p}$ having a commercial frequency or a frequency within a range of 20 KHz to 40 KHz is supplied to the through conductors 4 and 5 of the high-voltage capacitor 19. The high-voltage thus supplied is then supplied to the magnetron from the through conductors 4 and 5 via the inductors 17 and 18. Any noise coming through the through conductors 4 and 5 is absorbed through a filtering effect achieved by the capacitor 2 and the inductors 17 and 18.

In addition, since the insulating resin portions 7 and 8 fill the space around the capacitor 2, a sufficient degree of reliability is assured even when the high-voltage capacitor is utilized in a microwave oven which constitutes a hot and moist environment.

Furthermore, the high-voltage capacitor 19 provided with the insulating case 6 structured as described above achieves outstanding voltage withstand performance in a humid environment. As a result, by adopting the high-voltage capacitor 19 according to the present invention in the magnetron of a microwave oven which constitutes a hot and humid environment, the reliability of the magnetron is improved.

What is claimed is:

1. A high-voltage capacitor comprising:
   at least one grounding member having a raised portion provided with at least one through hole;
   at least one capacitor element including a dielectric ceramic member having at least one through hole and is provided with electrodes at surfaces where said through hole of said dielectric ceramic member opens, one of said electrodes being connected to said grounding member so as to achieve electrical continuity;

at least one through conductor passing through said grounding member and said capacitor element and connected to another of said electrodes so as to achieve electrical continuity;

at least one insulating tube covering said through conductor;

at least one insulating case provided at one surface of said grounding member;

at least one insulating cover provided at another surface of said grounding member opposite said one surface; and insulating resin filling a space inside said at least one insulating case, a space inside said at least one insulating cover and a space around said at least one capacitor element, wherein:

said at least one insulating case comprises a mixture containing polybutylene terephthalate and an inorganic substance containing glass powder and ceramic powder, the content of said inorganic substance is set within a range of 15 wt % to 45 wt % relative to the quantity of said mixture.

2. The high-voltage capacitor of claim 1, wherein:

said at least one insulating case has one end fixed around an external circumference of said raised portion and has a height of 12 mm or greater.

3. The high-voltage capacitor of claim 1, wherein:

said at least one through conductor comprises a molded round bar having a tab portion formed by press-machining said round bar.

4. A magnetron having a filter comprising the high-voltage capacitor of claim 1.

* * * * *